United States Patent Office 3,578,666
Patented May 11, 1971

---

3,578,666
SUBSTITUTED IMIDAZOLINES, PYRIMIDINES AND DIAZEPINES
Robert E. Manning, Mountain Lakes, N.J., assignor to Sandoz-Wander, Inc., Hanover, N.J.
No Drawing. Filed Aug. 26, 1968, Ser. No. 755,400
Int. Cl. C07d 19/06
U.S. Cl. 260—256.5      8 Claims

ABSTRACT OF THE DISCLOSURE

Substituted imidazolines (e.g., 2 - (2 - imidazolinylmethylthio) - 3,4,5,6 - tetrahydro-pyrimidine dihydrochloride) and substituted pyrimidines (e.g., 6 - (2 - aminoethylimino) - 2,3,4,8 - tetrahydro - 6H - thiazolo[3,4-a]pyrimidine dihydrochloride). The compounds are useful as hypotensives.

---

This invention relates to imidazolines, pyrimidines and diazepines. More particularly, it relates to substituted imidazolines, pyrimidines and diazepines, intermediates therefor and to processes for their preparation.

The compounds of this invention may be represented by the formulas:

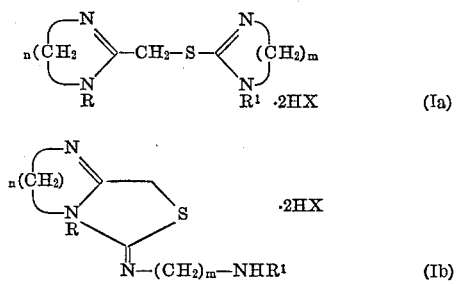

where
R and $R^1$ are each H or lower alkyl,
each X is Cl or Br, and
$n$ and $m$ are each 2 to 4.

The process for preparing the compounds of Formulas Ia and Ib may be represented as follows:

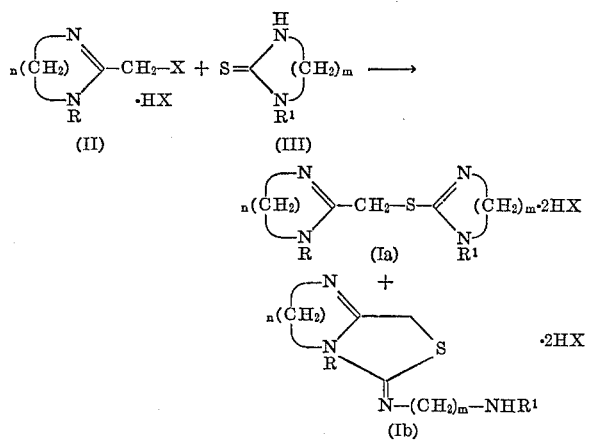

where R, $R^1$, X, $n$ and $m$ have the above-stated significance.

The substituted compounds of Formulas Ia and Ib are prepared by treating a compound of Formula II, e.g., 2-chloromethylimidazoline hydrochloride, with a substituted thiourea of Formula III, e.g., propylene thiourea, in an alcohol-acetone or alcohol-ether solvent mixture at a temperature of 15 to 40° C., preferably 20 to 30° C. The ratio of alcohol to acetone on ether is from 1:4 to 4:1. The alcohol may be methanol, ethanol, propanol, isopropanol and the like. Neither the temperature of the reaction or the solvent used is critical.

Although not known with certainty, it is believed that the compounds of Formula Ib are obtained via compounds Ia. In any event, the reaction mixture contains both types of compounds.

Certain of the compounds of Formulas II and III above are known and are prepared by methods disclosed in the literature. Those not specifically disclosed are prepared from known materials in an analogous manner.

Conventional recovery techniques such as recrystallization may be used to recover the compounds of Formula Ia and Ib.

The compounds of Formulas Ia and Ib are useful because they possess pharmacological activity in animals. More particularly, the compounds are useful as hypotensive agents as indicated by their activity in the hypertensive rat given orally 30 mg./kg. of animal body weight of active material. The test method is basically as described by A. Gollman "A Simplified Procedure for Inducing Chronic Renal Hypertension in the Mammal"—Proc. Soc. Exptl. Bio. & Med., vol. 57, page 102 (1944).

The compounds Ia and Ib may be combined with a pharmaceutically acceptable carrier or adjuvant. They may be administered orally or parenterally. The dosage will vary depending upon the mode of administration utilized and the particular compound employed.

In general satisfactory results are obtained when the compounds are administered at a daily dosage of from about 0.3 to 50 milligrams per kilogram of animal body weight. This daily dosage is preferably given in divided dosage, e.g., 2 to 4 times a day, or in sustained release form. For most large animals, total daily dosage is from about 20 to 350 milligrams. Dosage forms suitable for internal administration comprise from about 5 to 175 milligrams of the compound in admixture with a solid or liquid pharmaceutical carrier or diluent.

A representative formulation suitable for oral administration is a tablet prepared by standard tabletting techniques which contain the following:

| Ingredients: | Parts by weight |
| --- | --- |
| 2-(2 - imidazoinylmethylthio) - 3,4,5,6 - tetrahydro-pyrimidine dihydrochloride | 50 |
| Tragacanth | 2 |
| Lactose | 39.5 |
| Corn starch | 5 |
| Talcum | 3 |
| Magnesium stearate | 0.5 |

This invention is illustrated but not limited by the following examples.

EXAMPLE 1

2-[2-(1-methylimidazolinyl)methylthio]-2-imidazoline dihydrochloride

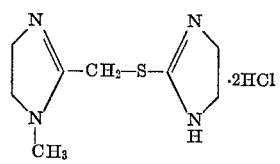

A mixture of 2-chloromethyl-1-methylimidazoline hydrochloride (1.7 g.), ethylene thiourea (1.0 g.), ethanol (5 ml.) and acetone (15 ml.) was stirred at room temperature for 18 hours. The resultant solid was collected by filtration and crystallized from methanol-ether (1:1) to give the product, 1.0 g., M.P. 188–190° C. dec.

EXAMPLE 2

6-(2-aminoethylimino)-2,3,4,8-tetrahydro-6H-thiazolo[3,4-a]pyrimidine dihydrochloride

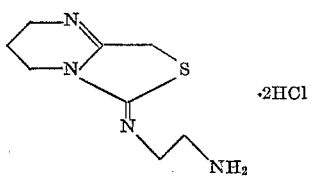

A mixture of 2-chloromethyl-3,4,5,6-tetrahydropyrimidine hydrochloride (1.7 g.), ethylenethiourea (1.2 g.), ethanol (20 ml.), acetone (4 ml.) was stirred at room temperature for 38 hours. The resultant solution is concentrated to 10 ml. in vacuo to give the product, 800 mg., M.P. 188-182° C.

EXAMPLE 3

2-(2-imidazolinylmethylthio)-3,4,5,6-tetrahydropyrimidine dihydrochloride

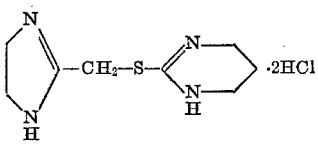

A mixture of 2-chloroethylimidazoline hydrochloride (6.2 g.), propylenethiourea (4.6 g.), ethanol (20 ml.) and acetone (60 ml.) was stirred at room temperature for 2 days. The resultant solid was collected by filtration and crystallized from methanol-ether (1:1) to give the product, 9.0 g., M.P. 120-123° C.

EXAMPLE 4

2-(3,4,5,6-tetrahydropyrimidin-2-yl methylthio)-3,4,5,6-tetrahydropyrimidine dihydrochloride

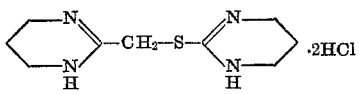

A mixture of 2-chloromethyl-3,4,5,6-tetrahydropyrimidine hydrochloride (3.4 g.), propylenethiourea (2.3 g.), ethanol (10 ml.) and acetone (30 ml.) was stirred at room temperature from 70 hours. The resultant solid was collected by filtration and crystallized from ethanol to give the product, 2.6 g. M.P. 241° C. dec.

EXAMPLE 5

2-(2-imidazolinylmethylthio)-1,3-diazepine dihydrochloride

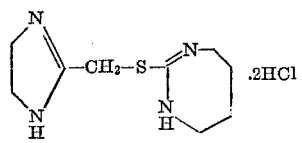

A mixture of 2-chloromethylimidazoline hydrochloride (6.2 g.), tetramethylenethiourea (5.2 g.), ethanol (20 ml.) and acetone (60 ml.) was stirred at room temperature for 2 days. The resultant solid was collected by filtration and crystallized from methanol-ether (1:2) to give the product, 5.8 g., M.P. 177°-179° C., dec.

EXAMPLE 6

2-(2,4,5,6-tetrahydropyrimidin-2-ylmethylthio)-1,3-diazepine dihydrochloride

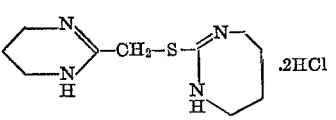

A mixture of 2-chloromethyl-3,4,5,6-tetrahydropyrimidine, hydrochloride (3.4 g.) tetramethylenethiourea (2.6 g.), ethanol (10 ml.) and acetone (30 ml.) was stirred at room temperature for 42 hours. The resultant solid was collected by filtration and crystallized from ethanol to give the product, 1.4 g., M.P. 187°-189° C., dec.

EXAMPLE 7

1-methyl-2-(2-imidazolinylmethylthio)-2-imidazoline dihydrochloride

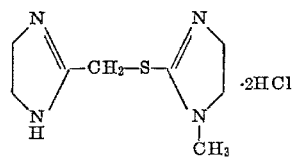

A mixture of 2-chloromethylimidazoline hydrochloride (6.2 g.), N-methylethylenethiourea (4.6 g.), ethanol (20 ml.) and acetone (60 ml.) was stirred at room temperature for 36 hours. The resultant solid was collected by filtration and crystallized from ethanol-acetone (1:1) to give the product, 3.6 g., M.P. 128-131° C.

EXAMPLE 8

1-methyl-2-[2-(1-methylimidazolinyl)methylthio]-2-imidazoline dihydrochloride

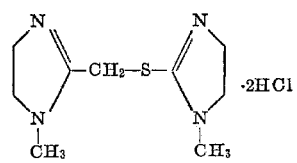

A mixture of 2-chloromethyl-1-methylimidazoline hydrochloride (1.9 g), N-methylethylenethiourea (1.3 g.), ethanol (5 ml.) and acetone (15 ml.) was stirred at room temperature for 40 hours. The resultant solid was collected by filtration and crystallized from ethanol-acetone (2:1) to give the product, 0.9 g., M.P. 187°-189° C., dec.

EXAMPLE 9

6-(2-methylaminoethylimino)-2,3,4,8-tetrahydro-6H-thiazolo[3,4-a]pyrimidine dihydrochloride

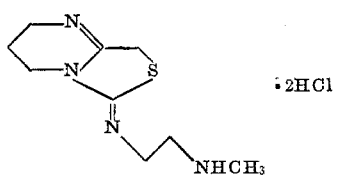

A mixture of 2-chloromethyl-3,4,5,6-tetrahydropyrimidine hydrochloride (5.1 g.), N-methlethylenethiourea (3.5 g.), ethanol (60 ml.) was stirred at room temperature for 42 hours. The resultant solution was concentrated in vacuo to 40 ml. volume and diluted with 10 ml. acetone to give 3.1 g. product, M.P. 214-216° C. dec.

What is claimed is:

1. A compound of the formula

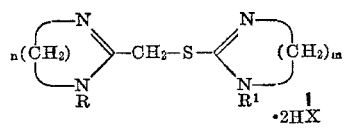

where

R and $R^1$ are each H or lower alkyl,
each X is Cl or Br, and
$n$ and $m$ are 2 to 4.

2. The compound of claim 1 which is 2-[2-(1-methylimidazolinyl)methylthio[-2-imidazoline dihydrochloride.

3. The compound of claim 1 which is 2-(2-imidazolinylmethylthio) - 3,4,5,6 - tetrahydro - pyrimidine dihydrochloride.

4. The compound of claim 1 which is 2-(3,4,5,6- tetrahydropyrimidin-2-yl methythio) - 3,4,5,6, - tetrahydropyrimidine dihydrochloride.

5. The compound of claim 1 which is 2-(2-imidazolinyl-methylthio)-1,3-diazepine dihydrochloride.

6. The compound of claim 1 which is 2-(3,4,5,6-tetrahydropyrimidin - 2 - yl methylthio) - 1,3 - diazepine dihydrochloride.

7. The compound of claim 1 which is 1-methyl-2-(2-imidazolinylmethylthio)-2-imidazoline dihydrochloride.

8. The compound of claim 1 which is 1-methyl-2-[2-(1 - methylimidazolinyl)methylthio]-2-imidazoline dihydrochloride.

References Cited

UNITED STATES PATENTS

| | | | |
|---|---|---|---|
| 2,987,522 | 6/1961 | Shen | 260—256.5 |
| 3,334,112 | 8/1967 | Wright et al. | 260—309.6 |

ALEX MAZEL, Primary Examiner

R. J. GALLAGHER, Assistant Examiner

U.S. Cl. X.R.

260—239, 256.4, 309.6, 306.7; 424—251